J. TARAS.
HORSESHOE.
APPLICATION FILED APR. 18, 1914. RENEWED FEB. 25, 1915.
1,138,259.
Patented May 4, 1915.
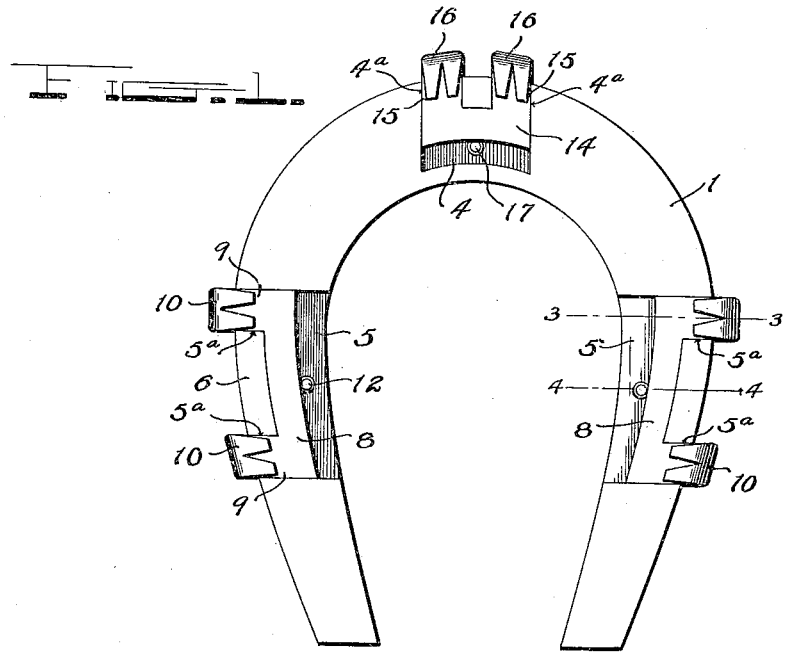
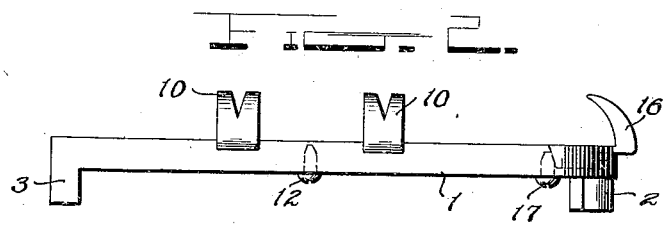
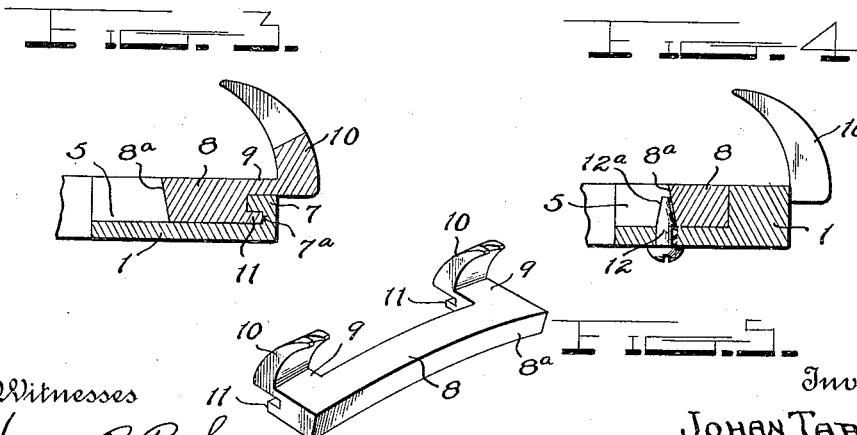
Witnesses
Harry B. Rook.
Harriet B. Cornwall.
Inventor
JOHAN TARAS
By H. S. Hice
Attorney

UNITED STATES PATENT OFFICE.

JOHAN TARAS, OF BENTLEYVILLE, PENNSYLVANIA.

HORSESHOE.

1,138,259.   Specification of Letters Patent.   Patented May 4, 1915.

Application filed April 18, 1914, Serial No. 832,825.   Renewed February 25, 1915.   Serial No. 10,612.

*To all whom it may concern:*

Be it known that I, JOHAN TARAS, citizen of Austria-Hungary, residing at Bentleyville, in the county of Washington and State of Pennsylvania, have invented certain new and useful Improvements in Horseshoes, of which the following is a specification.

The present invention relates to certain new and useful improvements in horseshoes, the object of the invention being to provide a device of this character which embodies novel features of construction whereby it can be readily applied to the hoof of a horse without the use of nails or like fastening means.

A further object of the invention is to provide a nailless horseshoe which is comparatively simple and inexpensive in its construction, which can be readily applied to a horse's hoof or removed therefrom, which will not injure the hoof, and which will remain securely in position thereon.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a top plan view of a horseshoe constructed in accordance with the invention, the hoof engaging members being shown in operative position. Fig. 2 is a side elevation of the same. Fig. 3 is an enlarged sectional view on the line 3—3 of Fig. 1. Fig. 4 is a similar view on the line 4—4 of Fig. 1. Fig. 5 is an enlarged detail perspective view of one of the side hoof engaging elements.

Corresponding and like parts are referred to in the following description and indicated in all the views of the drawing by the same reference characters.

Specifically describing the present embodiment of the invention, the numeral 1 designates the body of a horseshoe which is similar in shape to an ordinary horseshoe and is formed with the conventional toe calk 2 and heel calks 3. The top of the body portion 1 is provided at the toe of the shoe with a recess 4, and at opposite sides thereof with the recesses 5. Each of the said recesses 5 is longitudinally disposed and communicates at opposite ends thereof with branches $5^a$ which extend through the outside of the shoe. A raised portion or block 6 is arranged between the two branches $5^a$ and ribs 7 extend across the mouths of the branches $5^a$, the said ribs being undercut on the inner sides thereof as indicated at $7^a$.

A block or slide 8 having a thickness corresponding to the depth of the recess 5 is fitted within each of the said recesses. These blocks 8 are provided at opposite ends thereof with the lateral arms 9 which fit within the branches $5^a$ of the recesses 5, said arms projecting beyond the sides of the horseshoe and carrying the upwardly and inwardly curved hoof engaging claws 10. These claws 10 are preferably bifurcated as shown and taper in thickness toward the extremities thereof so as to readily engage and obtain a firm grip upon the hoof of the horse.

By reference to Figs. 3 and 5, it will be observed that the arms 9 of the blocks or slides 8 have the end portions thereof suitably cut away to receive the ribs or ledges 7 and are formed with the tongues or lips 11 which are adapted to enter the undercut sides of the ribs or ledges 7 so as to interlock therewith and hold the hoof engaging elements in position upon the shoe. When the tongues 11 enter the undercut sides $7^a$ of the ledges 7, the outer sides of the slides 8 engage and bear against the raised portions 6 of the shoe, as indicated by Fig. 1. The hoof engaging elements are then securely interlocked with the shoe, although in order to disconnect the same from the shoe, it is merely necessary to move the slides 8 inwardly away from the raised portions 6 a sufficient amount to withdraw the tongues 11 from the undercut portions $7^a$ of the ledges 7.

The inner side faces of the slides 8 are preferably beveled as indicated at $8^a$ so as to engage the beveled noses $12^a$ of retaining screws 12 which are threaded in the sides of the horseshoe and pass through the same from the bottom thereof. When these retaining screws 12 are removed, the hoof engaging elements can be readily disconnected from the shoe, although after the parts have been properly assembled and the retaining screws 12 threaded into position, the beveled noses $12^a$ of the latter engage the beveled side walls $8^a$ of the slides 8 so as to retain the slides in a forcible engagement with the raised portions 6, thereby holding the tongues 11 in the undercut portions 7ª of the ledges 7 and maintaining the parts in an interlocking connection.

In a similar manner the recess 4 at the toe of the shoe communicates with branches 4ª leading to the outside of the shoe, the mouths of the branches being provided with undercut ledges which are identical in construction with the undercut ledges or ribs 7 previously described. A slide 14 is fitted in the recess 4, said slide being formed with the arms 15 carrying the hoof engaging claws 16 and constructed exactly as in the previous instance to interlock with the undercut ledges. A retaining screw 17 is shown as provided to lock the slide 14 in operative position, and this screw is identical in construction and operates in the same manner as the retaining screws 12. It will thus be obvious that hoof engaging elements are provided at the toe and two sides of the horseshoe, so that when these elements are locked in operative position they will engage the hoof of the horse and retain the shoe securely in position thereon without the necessity of using nails or like driven fastening members.

If desired, the slides 8 and claws 10 can be formed of malleable metal to admit of the latter being bent with respect to the slides. If necessary, they could be bent outwardly preparatory to applying the shoe to the hoof and subsequently bent inwardly into engagement with the hoof.

Having thus described the invention, what I claim as new and desire to secure by Letters Patent, is:—

1. A nailless horseshoe including a body portion provided with a recess communicating with spaced lateral branches extending through an edge of the body portion, undercut ledges being provided in the said lateral branches, a slide fitted within the recess and provided with a pair of lateral arms adapted to be received within the lateral branches, tongues upon the lateral arms for engaging the undercut ledges, hoof engaging claws upon the lateral arms, and means for clamping the slides in position within the recess.

2. A nailless horseshoe including a body portion formed with a recess communicating with a pair of lateral branches extending through an edge of the body portion, undercut ledges being provided which extend across the lateral branches, a slide fitted within the recess and formed with lateral arms adapted to be received within the lateral branches of the recess, tongues upon the lateral arms for engaging the undercut ledges, hoof engaging claws carried by the lateral arms of the slide, and a retaining screw threaded within the body portion and engaging the slide to hold it rigidly in operative position.

3. A nailless horseshoe including a body portion provided with a recess communicating with spaced lateral branches extending through an edge of the shoe, undercut ledges being provided which extend across the said lateral branches, a slide fitted within the recess and provided with a beveled outer edge, said slide being formed with a pair of lateral arms adapted to be received within the lateral branches of the recess, tongues upon the lateral arms adapted to engage and interlock with the undercut ledges, hoof engaging claws carried by the lateral arms, and a retaining screw threaded within the body portion and formed with a beveled nose adapted to engage the beveled edge of the slide to retain the slide rigidly in operative position.

In testimony whereof I affix my signature in presence of two witnesses.

JOHAN TARAS.

Witnesses:
C. K. FRYE,
S. KLEPOCZ.

Copies of this patent may be obtained for five cents each, by addressing the "Commissioner of Patents, Washington, D. C."